(12) United States Patent
Burra et al.

(10) Patent No.: US 8,227,929 B2
(45) Date of Patent: Jul. 24, 2012

(54) MULTI-USE ENERGY STORAGE FOR RENEWABLE SOURCES

(75) Inventors: Rajni Kant Burra, Bangalore (IN); Robert William Delmerico, Clifton Park, NY (US); Sumit Bose, Niskayuna, NY (US); Divya Kurthakoti Chandrashekhara, Bangalore (IN)

(73) Assignee: General Electric Company, Niskayuna, NY (US)

( * ) Notice: Subject to any disclaimer, the term of this patent is extended or adjusted under 35 U.S.C. 154(b) by 456 days.

(21) Appl. No.: 12/566,739

(22) Filed: Sep. 25, 2009

(65) Prior Publication Data

US 2011/0074151 A1 Mar. 31, 2011

(51) Int. Cl.
*F03D 9/00* (2006.01)
*H02P 9/04* (2006.01)
*H02P 11/00* (2006.01)
*H02P 9/00* (2006.01)
*H02H 7/06* (2006.01)

(52) U.S. Cl. ............... 290/44; 290/55; 322/25
(58) Field of Classification Search .......... 290/44, 290/55; 322/25
See application file for complete search history.

(56) References Cited

U.S. PATENT DOCUMENTS

| | | | | |
|---|---|---|---|---|
| 4,333,018 A | | 6/1982 | Bottrell | 290/55 |
| 4,426,192 A | * | 1/1984 | Chertok et al. | 416/1 |
| 4,439,108 A | | 3/1984 | Will | 416/131 |
| 4,490,093 A | * | 12/1984 | Chertok et al. | 416/26 |
| 4,782,241 A | * | 11/1988 | Baker et al. | 307/66 |
| 4,816,696 A | * | 3/1989 | Sakayori et al. | 290/52 |
| 5,083,039 A | * | 1/1992 | Richardson et al. | 290/44 |
| 5,155,375 A | * | 10/1992 | Holley | 290/44 |
| 5,289,041 A | * | 2/1994 | Holley | 290/44 |
| 5,584,655 A | | 12/1996 | Deering | 416/31 |
| 5,729,118 A | * | 3/1998 | Yanagisawa et al. | 322/29 |
| 5,798,631 A | * | 8/1998 | Spee et al. | 322/25 |
| 5,798,633 A | * | 8/1998 | Larsen et al. | 323/207 |
| 6,137,187 A | * | 10/2000 | Mikhail et al. | 290/44 |
| 6,208,109 B1 | * | 3/2001 | Yamai et al. | 318/716 |
| 6,420,795 B1 | * | 7/2002 | Mikhail et al. | 290/44 |
| 6,543,588 B1 | * | 4/2003 | Raad | 188/267 |

(Continued)

FOREIGN PATENT DOCUMENTS

DE 10022974 A1 11/2001

(Continued)

OTHER PUBLICATIONS

Franziska Adamak; "Optimal Multi Energy Supply for Regions with Increasing Use of Renewable Resources"; IEEE Energy 2030, Nov. 2008; 6 Pages.

*Primary Examiner* — Pedro J Cuevas
(74) *Attorney, Agent, or Firm* — Ann M. Agosti

(57) ABSTRACT

A power generation system having a wind turbine blade assembly, a generator mechanically coupled to the blade assembly, and a power converter coupled to the generator is provided. An energy storage device and a bidirectional converter coupling the energy storage device to the power converter are also provided in the system. An inertia controller is provided for generating a first transient signal to regulate active power from the wind turbine system when a power grid signal is outside of a respective signal range. The system further includes an energy storage controller for providing a second transient signal to the bidirectional converter to regulate a power to or from the energy storage device based upon the first transient signal, power generating system conditions or combinations thereof.

21 Claims, 4 Drawing Sheets

U.S. PATENT DOCUMENTS

| | | | |
|---|---|---|---|
| 6,566,764 B2* | 5/2003 | Rebsdorf et al. | 290/44 |
| 6,670,721 B2* | 12/2003 | Lof et al. | 290/44 |
| 6,847,128 B2* | 1/2005 | Mikhail et al. | 290/44 |
| 6,856,038 B2* | 2/2005 | Rebsdorf et al. | 290/44 |
| 6,856,039 B2* | 2/2005 | Mikhail et al. | 290/44 |
| 6,909,198 B2* | 6/2005 | Ragwitz et al. | 290/44 |
| 7,002,260 B2 | 2/2006 | Stahlkopf | 290/44 |
| 7,042,110 B2* | 5/2006 | Mikhail et al. | 290/44 |
| 7,095,131 B2* | 8/2006 | Mikhail et al. | 290/44 |
| 7,276,807 B2* | 10/2007 | Luetze et al. | 290/44 |
| 7,327,123 B2* | 2/2008 | Faberman et al. | 322/37 |
| 7,391,126 B2* | 6/2008 | Liu et al. | 290/44 |
| 7,423,406 B2* | 9/2008 | Geniusz | 318/800 |
| 7,459,890 B2* | 12/2008 | Baratto et al. | 322/44 |
| 7,476,987 B2 | 1/2009 | Chang | 290/55 |
| 7,622,815 B2* | 11/2009 | Rivas et al. | 290/44 |
| 7,750,490 B2* | 7/2010 | Scholte-Wassink | 290/44 |
| 7,952,232 B2* | 5/2011 | Burra et al. | 307/64 |
| 8,058,753 B2* | 11/2011 | Achilles et al. | 307/153 |
| 8,093,772 B2* | 1/2012 | Scott et al. | 310/71 |
| 8,109,722 B2* | 2/2012 | Gamble et al. | 416/1 |
| 2002/0079706 A1* | 6/2002 | Rebsdorf et al. | 290/44 |
| 2004/0026929 A1* | 2/2004 | Rebsdorf et al. | 290/44 |
| 2007/0024059 A1 | 2/2007 | D'Atre et al. | 290/44 |
| 2007/0036653 A1 | 2/2007 | Bak et al. | 416/98 |
| 2007/0052244 A1 | 3/2007 | Hudson | 290/44 |
| 2007/0085343 A1 | 4/2007 | Fortmann | 290/44 |
| 2008/0001408 A1* | 1/2008 | Liu et al. | 290/44 |
| 2009/0230689 A1* | 9/2009 | Burra et al. | 290/55 |
| 2010/0140944 A1* | 6/2010 | Gardiner et al. | 290/53 |
| 2010/0292852 A1* | 11/2010 | Gertmar et al. | 700/287 |
| 2011/0074151 A1* | 3/2011 | Burra et al. | 290/44 |
| 2011/0089693 A1* | 4/2011 | Nasiri | 290/44 |
| 2011/0222320 A1* | 9/2011 | Delmerico et al. | 363/37 |
| 2011/0285130 A1* | 11/2011 | Thisted | 290/44 |
| 2012/0061963 A1* | 3/2012 | Thisted | 290/44 |

FOREIGN PATENT DOCUMENTS

| | | |
|---|---|---|
| DE | 10127451 A1 | 12/2002 |
| DE | 20308297 U1 | 3/2004 |
| DE | 102004005169 B3 | 11/2005 |
| EP | 0128774 A2 | 12/1984 |
| EP | 0508790 A1 | 10/1992 |
| EP | 1164691 A1 | 12/2001 |
| EP | 1519040 A1 | 3/2005 |
| EP | 1548278 A2 | 6/2005 |
| EP | 1489300 A1 | 5/2010 |
| FR | 2826524 A1 | 12/2002 |
| FR | 2814504 A1 | 2/2003 |
| JP | 2001178194 A | 6/2001 |
| JP | 2001339996 A | 12/2001 |
| JP | 2003158895 A | 5/2003 |
| JP | 2003324850 A | 11/2003 |
| JP | 2006257985 A | 9/2006 |
| JP | 2006296189 A | 10/2006 |
| JP | 2007009804 A | 1/2007 |
| WO | 0073652 A1 | 12/2000 |
| WO | 02102838 A2 | 12/2002 |
| WO | 03023224 A1 | 3/2003 |
| WO | 2005015012 A1 | 2/2005 |

* cited by examiner

MULTI-USE ENERGY STORAGE FOR RENEWABLE SOURCES

BACKGROUND

The invention relates generally to renewable energy sources and more specifically to the use of energy storage in conjunction with renewable energy sources. The invention additionally relates to grid frequency stabilization of grid connected renewable energy sources.

Wind-turbine generators (WTGs) and wind-plants are typically designed to deliver constant active and reactive power to a utility grid with the delivered power being independent of system frequency. This is accomplished by decoupling the rotor inertia and speed from the grid using fast acting power electronics and controls. Due to increases in wind-plant size and penetration, some utilities are now requiring that wind-plant and wind-turbine controls provide enhanced capabilities such as frequency stabilization.

At present wind turbines do not provide frequency regulation services, which are quite essential for maintaining stability (power balance) of the electric power system. Another factor for improving power system stability in wind turbines is inertia response. Generally, inertia controllers use rotor kinetic energy in response to frequency deviations on the grid. For example, if the frequency of the grid goes below the nominal value, the kinetic energy of the rotor is used to export electric power to the grid. This results in the slowing down of the rotor. Similarly, if the frequency of the grid increases above the nominal value, then the kinetic energy of the rotor is increased by importing electric power from the grid. This results in the speeding up of the rotor. Since there is a continuous dithering of frequency on the grid, the inertia controller in response to the frequency tends to cause the rotor speed and/or acceleration to dither. If the rotor mode of oscillation is in the proximity of the grid mode of oscillation, the coupled behavior may excite the resonance. Therefore, the use of rotor inertia for continuous frequency response may not be always possible. Thus, it would be desirable to have a system and method to efficiently address variability of renewable energy to help satisfy the related utility company requirements.

BRIEF DESCRIPTION

In accordance with an embodiment of the present invention, a power generation system including a wind turbine blade assembly, a generator mechanically coupled to the blade assembly, and a power converter coupled to the generator is provided. The system further includes at least one energy storage device and at least one bidirectional converter coupling the energy storage device to the power converter. An inertia controller and an energy storage controller are also provided in the system. The inertia controller provides a first transient signal to regulate active power from the wind turbine system when a power grid signal is outside of a respective signal range. The energy storage controller provides a second transient signal to the bidirectional converter to regulate a power to or from the energy storage device based upon the first transient signal, power generating system conditions, or combinations thereof.

In accordance with another embodiment of the present invention, a stabilization system for a power generation system including a non-conventional energy source coupled to a utility grid is provided. The system includes an energy storage device which is charged or discharged during transient conditions of a power grid and an inertia controller for providing a first transient signal to regulate inertia power from the power generation system when a power grid signal is outside of a respective signal range. The system further includes an energy storage controller for providing a second transient signal to regulate a power to or from the energy storage device based upon the first transient signal, power generating system conditions, or combinations thereof.

In accordance with yet another embodiment of the present invention, a stabilization method for a wind power generation system is provided. The method includes providing a first transient power generation signal to regulate a power from a wind turbine rotor when a grid frequency signal is outside of a respective signal range and providing a second transient power generation signal to regulate a power from energy storage based upon the first transient power generation signal, wind power generation system conditions, or combinations thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide a system and a method for transferring power from renewable energy sources to a power grid for stabilizing the grid frequency.

Figure 1:
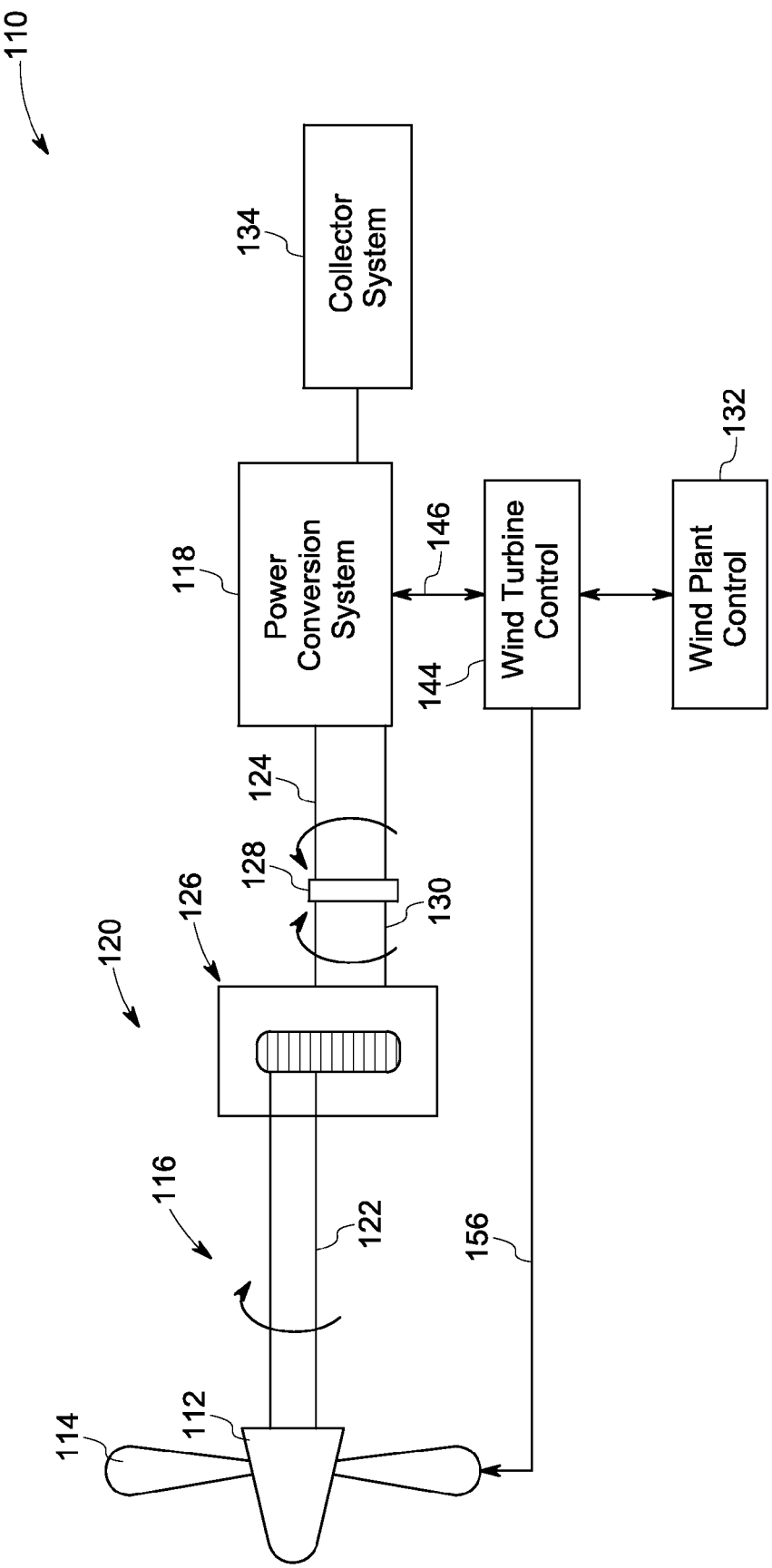
FIG. 1 is a high level block diagram of a typical wind power generation system.

Referring generally to FIG. 1, a wind turbine system 110 operable to generate electric power is illustrated. The wind turbine system 110 comprises a hub 112 having multiple blades 114. The blades 114 convert the mechanical energy of the wind into a rotational torque, which is further converted into electrical energy by the wind turbine system 110. The wind turbine system 110 further includes a turbine portion 116 that is operable to convert the mechanical energy of the wind into a rotational torque and a power conversion system 118 that is operable to convert the rotational torque produced by the turbine portion 116 into electrical power. A drive train 120 is provided to couple the turbine portion 116 to the power conversion system 118. The wind turbine power conversion system 118 typically comprises a doubly fed asynchronous generator with a power electronic converter for rotor field control or a synchronous generator for use with a full power electronic converter interface to collector system 134. The collector system generally includes turbine transformers, feeder cables and breakers up to the substation transformer. It should be noted that the collector system is a part of the power grid where the power grid usually refers to the metering point and beyond.

The turbine portion 116 includes a turbine rotor low-speed shaft 122 that is coupled to the hub 112. Rotational torque is transmitted from rotor low-speed shaft 122 to a generator shaft 124 via drive train 120. In certain embodiments, such as the embodiment illustrated in FIG. 1, drive train 120 includes a gear box 126 transmitting torque from low-speed shaft 122 to a high speed shaft 130. High speed shaft 130 is coupled to power conversion system shaft 124 with a coupling element 128.

Power conversion system 118 is coupled to wind turbine controls 144. Wind turbine controls 144 receive signals 146 from the power conversion system that are representative of the operating parameters of the system. Wind turbine controls 144, in response, may generate control signals, for example a pitch signal 156 to change the pitch of blades 114 or a torque signal for the power conversion system. Wind turbine controls 144 are also typically coupled to a wind plant controller 132.

Figure 2:
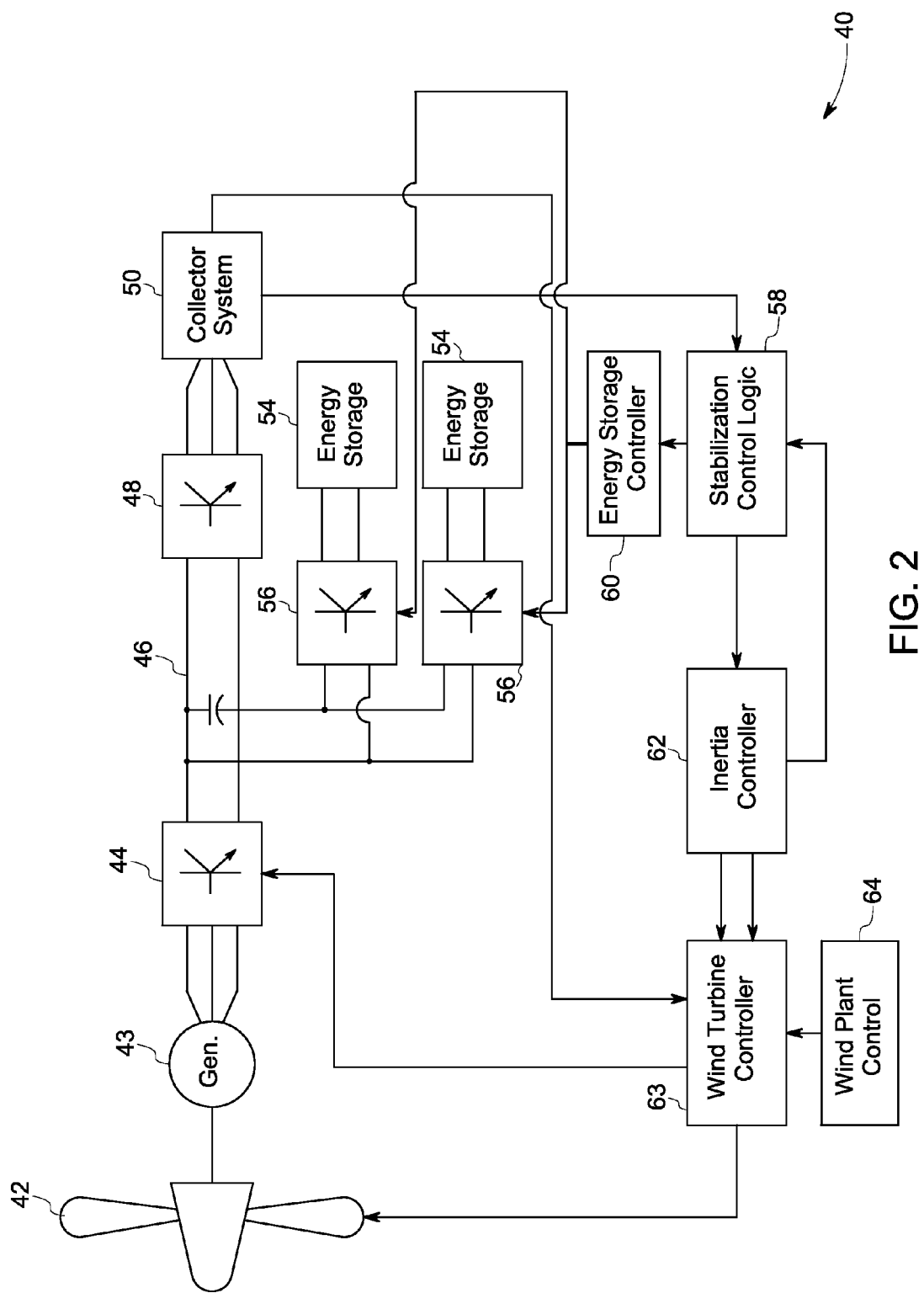
FIG. 2 is a diagrammatical representation of a wind power generation system including an energy storage device in accordance with an embodiment of the present invention.

FIG. 2 illustrates a wind power generation system 40 in accordance with an embodiment of the present invention. The system 40 includes wind turbine blades 42, a wind generator 43, a first AC to DC converter 44 coupled to a DC link 46 and a DC to AC inverter 48 which feeds electrical power to the collector system 50 which is part of the power grid. The system 40 further includes one or more energy storage devices 54 which are coupled to the DC link 46 via one or more respective bidirectional DC to DC converters 56. In one embodiment, for example, an energy storage device may comprise a supercapacitor or an electrochemical battery or combinations thereof. A stabilization control logic 58 provides commands to an energy storage controller 60, which controls a bidirectional DC to DC converter 56 based on the grid condition. The stabilization control logic 58 further provides commands to an inertia controller 62, which generates control signals, with one example being a transient pitch signal to the wind turbine controller 63 for changing the pitch of blades 42 or a transient torque signal to the wind turbine controller 63 for controlling the AC to DC converter 44. The wind turbine controller 63 also receives signals from the collector system 50 that are representative of the operating parameters of the system and a wind plant controller 64. The wind turbine controller 63, in response, may generate control signals such as a pitch signal and a torque signal for the power conversion system.

In one embodiment, the stabilization control logic 58 identifies the existence of fluctuations or disturbances in the grid frequency and provides a first transient power signal or first transient torque signal to the inertia controller 62. In one embodiment, the first transient power signal from the inertia controller 62 comprises two signals and, more specifically, a torque command $\Delta T$ and a turbine speed command $\Delta S$. In other embodiments, the first transient power signal comprises at least one of a power command, a torque command, and a speed command. The first transient power signal is typically further constrained so as to limit oscillatory coupling. The inertia controller 62 then uses the first transient power signal to generate a transient blade pitch control signal to adjust the pitch of the blades, a transient generator speed command signal, and or a first transient converter power command in order to stabilize the power generation system.

In one embodiment, if the inertia controller provides a first transient converter power command that is not positive, the stabilization control logic 58 provides a second transient power signal to the energy storage controller 60. The transient power command from the inertia controller would not be positive if the generator speed limits are reached or if a grid signal deviation falls within the inertia controller deadband. In one embodiment, the inertia controller deadband is in the range of 0.2 Hz to 2 Hz. The first transient power command from the inertia controller may also not be positive if the generator speed is not constant and is lower than the pre-disturbance generator speed or if the rate of change of the frequency is greater than zero. If the first transient command from the inertia controller is positive, then the stabilization control logic 58 does not provide any transient power signal to the energy storage controller 60, and the state of the energy storage does not alter. That is, the energy storage neither charges or discharges.

When the stabilization control logic 58 provides the second transient power signal to the energy storage controller 60 so that the energy storage controller provides the second power command to the converter, the converter 56 then provides the demanded transient power to the DC link from the energy storage device. In one example, the transient power or the temporary power boost may be increased by five to ten percent for up to ten seconds.

The use of stored energy for providing a transient response has several benefits in addition to grid stability, including, for example, use of stored energy that would not otherwise be available at the turbine output without the need to build in operating margin (such as by curtailed mode operation). In one embodiment, the energy storage device is charged during normal operation of the wind power generation system. For example, when there is no dip in the grid frequency or when the wind generator is supplying excess power, the stabilization control logic 58 may command the energy storage controller 60 and in turn the bidirectional converter 56 to fetch active power from the wind generator 43 via the first AC to DC converter 44 to charge the energy storage device 54. The stabilization control logic may provide a control signal to charge the energy storage device provided the power command signal from the inertia controller is not negative.

Figure 3:
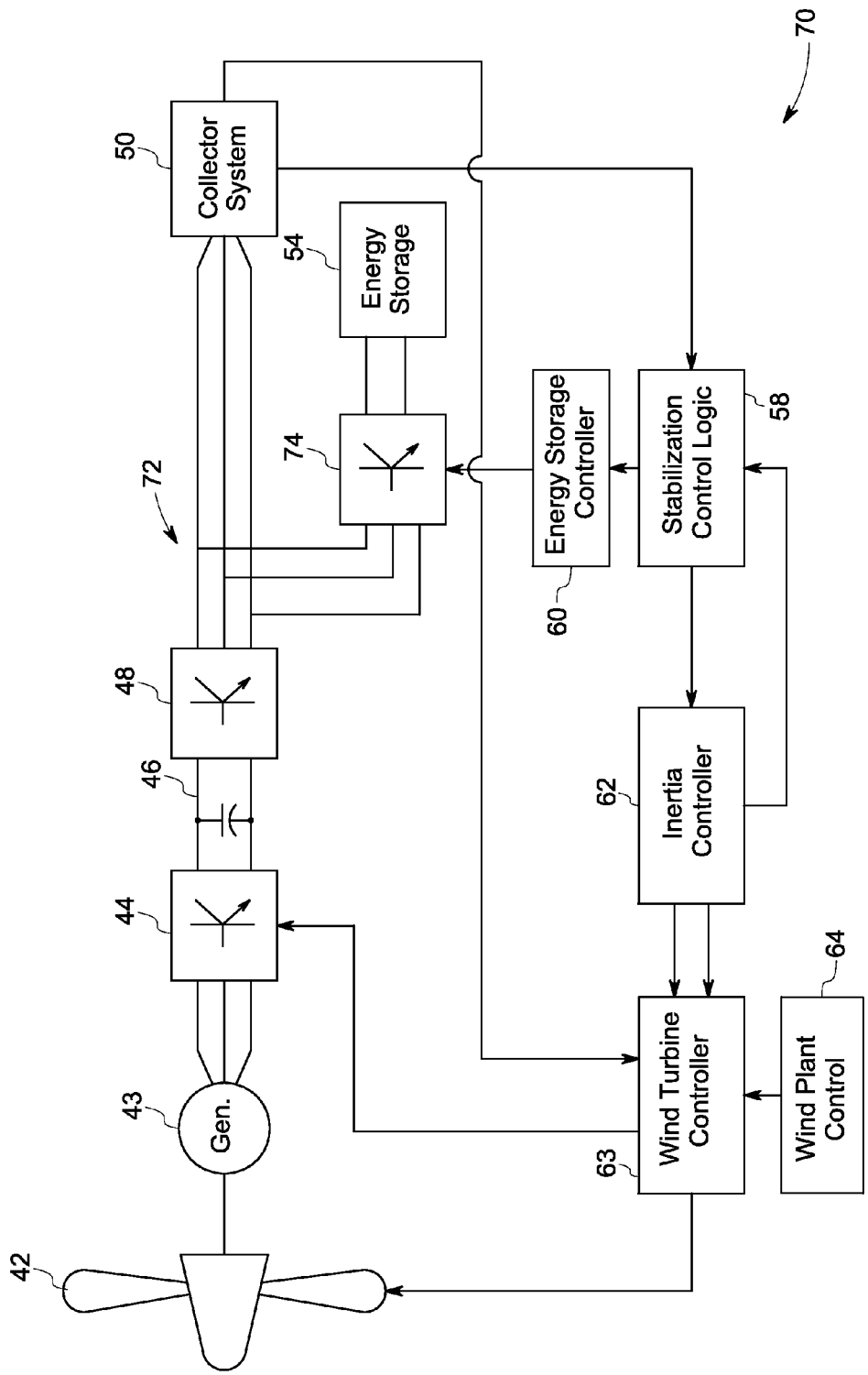
FIG. 3 is a diagrammatical representation of a wind power generation system including an energy storage device in accordance with another embodiment of the present invention.

FIG. 3 illustrates an alternative wind power generation system 70 in accordance with an embodiment of the present invention. In this embodiment, the energy storage device 54 is connected to AC side 72 of the DC to AC inverter 48. Thus, a bidirectional DC to AC converter 74 is utilized to transfer DC power from the energy storage device to the AC grid. It will be appreciated by those skilled in the art that a plurality of energy storage devices and a plurality of bidirectional DC to AC converters may also be employed in another embodiment. In one embodiment, the stabilization control logic 58 provides a transient power signal to the converter 44 and/or to the converter 74 through energy storage controller 60 and/or the wind turbine controller 63 based on the fluctuations in the grid frequency and the status of the inertia controller as described earlier. The embodiment of FIG. 3 will typically have lower installation and interconnection costs than the embodiment of FIG. 2. The coupling of the bidirectional converter 74 to the DC to AC converter may be either by direct connection to the DC to AC converter or by connection through the transformer 52 and/or power lines between the DC to AC converter and the grid. Thus, the bidirectional converter 74 may be situated either near the DC to AC converter or at a remote location, such as two to three miles from the DC to AC converter.

Figure 4:
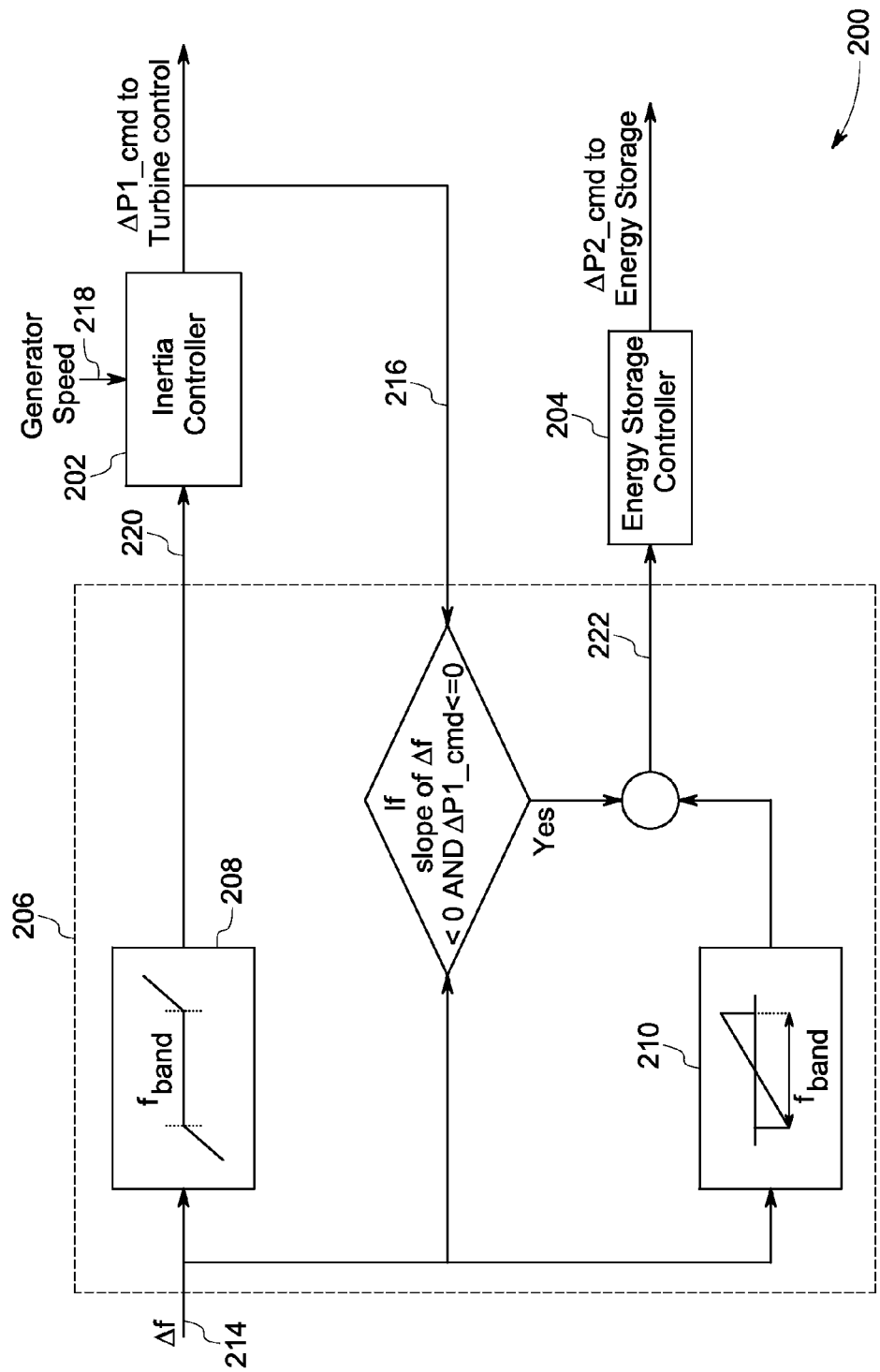
FIG. 4 is a high level block diagram of a detailed stabilization control system in accordance with an embodiment or the present invention.

FIG. 4 represents a detailed stabilization control system 200 of a renewable power generation system in accordance with an embodiment of the present invention. The control system 200 includes a stabilization control logic 206, an inertia controller 202, and an energy storage controller 204. The stabilization control logic 206 comprises a deadband limiter 208, a second deadband limiter 210, and a logic module 212. In one embodiment, the inputs to the stabilization control logic are a signal 214 of the power generation system and a first converter transient power command signal 216 of inertia controller. The signal 214 may comprise any appropriate signal with one example comprising a signal corresponding to power generation system frequency. In another embodiment, the signal 214 may include a voltage signal, a current signal, a power signal, or combinations thereof. The signal may be obtained either by direct measurement of the respective signal or by measurement of another signal and computations to obtain the respective signal.

The first deadband limiter 208 is configured for detecting when the signal 214 of the power generation system is outside of a signal range or a frequency band. If the signal 214 is outside of the specified signal range, the control logic 206 provides a first transient power command signal 220 to the inertia controller 202. The inertia controller 202 then provides the first transient power signal to the turbine controller if the generator speed 218 has not reached its limit. The first deadband limiter 208 is used to limit the response of inertia controller 202 to sufficiently large events. Frequency will always vary somewhat due to dithering that occurs when loads come on and off the system. For example, load variation typically affects frequency by about 0.05 Hz, depending on the system. The inertia controller 202 is used for more significant events that occur when a sudden difference is present between load and generation such as a utility system losing a large generator or a transmission line tripping. In one example, the deadband is set a plus or minus 0.12 Hz off the center point frequency. The selection of this limit is typically based on factors such as the location and nature of the power generation system and the variability of frequency center points. Stabilization system 200 may have a variable limit that is set by the end user after taking into account such factors.

The second deadband limiter 210 of the stabilization control logic 206 detects when the signal 214 is within a signal range. In one embodiment the signal range is 0.2 Hz to 2 Hz. The logic module provides a positive signal if the rate of change of frequency is greater than zero and if the first transient power command from the inertia controller is not positive. As described earlier, the first transient converter power command would not be positive if the generator speed limits are reached or if the grid frequency deviation falls within the inertia controller deadband. The first converter power command from the inertia controller may also not be positive if the wind speed is not constant and it is lower than the pre-disturbance wind speed or if the rate of change of the frequency is greater than zero. If the signal from the logic module is positive and the signal is 214 is within the specified range, then the stabilization control logic 206 provides a second transient power signal 222 to the energy storage controller 204. The second transient power signal 222 may be to charge the energy storage or to discharge the energy storage device by providing power to the grid. The energy storage device is charged when the wind power generation exceeds the load provided the first power command signal from the inertia controller is not negative. Thus, when the signal 214 is outside of a signal range, inertia controller operates to provide transient power and when the signal 214 is within the signal range the energy storage controller operates to provide the transient power resulting in continuous frequency stabilization of the system.

One unique feature of this wind turbine system is that it allows the wind turbines to provide transient response even during no or low wind periods. The advantage of the scheme is improved frequency stability of the power system by providing inertia response and primary frequency regulation provided by coupling the wind inertia response and the energy storage. The inertia response reduces the magnitude of rate of change of frequency and thereby reduces the magnitude of frequency peak. Additionally, although wind turbines are illustrated as the energy sources, the concepts disclosed herein are believed to be applicable to any non-conventional energy sources with several other examples including solar power generation systems, microturbines, and fuel cells.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising
a wind turbine blade assembly;
a generator mechanically coupled to the blade assembly;
a power converter coupled to the generator;
an energy storage device;
a bidirectional converter coupling the energy storage device to the power converter;
an inertia controller configured to provide a first transient signal to regulate active power from the wind turbine system when a power grid signal is outside of a respective signal range; and
an energy storage controller configured to provide a second transient signal to the bidirectional converter to regulate a power to or from the energy storage device based upon the first transient signal, power generating system conditions, or combinations thereof.

2. The power generation system of claim 1 wherein the bidirectional converter is coupled between the energy storage device and a DC link of the power converter.

3. The power generation system of claim 1, wherein the energy storage devices comprises a plurality of energy storage devices.

4. The power generation system of claim 3, wherein the bidirectional converter comprises a plurality of bidirectional converters.

5. The power generation system of claim 2, wherein the bidirectional converter comprises a DC to DC converter.

6. The power generation system of claim 1 wherein the bidirectional converter is coupled between the energy storage device and an output side of the power converter.

7. The power generation system of claim 6, wherein the bidirectional converter comprises a DC to AC inverter.

8. The power generation system of claim 1 wherein the energy storage device comprises a supercapacitor, an electrochemical battery, or combinations thereof.

9. The power generation system of claim 1, wherein the inertia controller is further configured to prevent the first transient signal from causing the generator to operate outside of at least one operating constraint.

10. The power generation system of claim 9, wherein the at least one operating constraint includes a generator rotation speed range.

11. The power generation system of claim 1, wherein the power grid signal comprises a power generation system frequency signal.

12. The power generation system of claim 11, wherein the signal range comprises 0.2 Hz-2 Hz.

13. The power generation system of claim 1, wherein the power grid signal comprises a voltage signal, a current signal, a power signal, or combinations thereof.

14. The power generation system of claim 1, wherein the first transient signal comprises a power command, a torque command, a turbine speed command, or combinations thereof.

15. The power generation system of claim 1, wherein the first transient signal comprises a torque command and a turbine speed command.

16. The power generation system of claim 1, wherein the second transient signal comprises a charging signal or a discharging signal for the energy storage device.

17. A stabilization system for a power generation system including a non-conventional energy source coupled to a utility grid, the stabilization system comprising:
- an energy storage device configured to be charged or discharged during transient conditions of a power grid;
- an inertia controller configured to provide a first transient signal to regulate inertia power from the power generation system when a power grid signal is outside of a respective signal range; and
- an energy storage controller configured to provide a second transient signal to regulate a power to or from the energy storage device based upon the first transient signal, power generating system conditions, or combinations thereof.

18. The stabilization system of claim 17, wherein the energy source has a rotating inertia decoupled from the utility grid by a power electronic converter.

19. The stabilization system of claim 17, wherein the energy source comprises a wind turbine or a microturbine.

20. A stabilization method for a wind power generation system comprising:
- providing a first transient power generation signal to regulate a power from a wind turbine rotor when a grid frequency signal is outside of a respective signal range;
- providing a second transient power generation signal to regulate a power from energy storage based upon the first transient power generation signal, wind power generation system conditions, or combinations thereof.

21. The method of claim 20, wherein the transient power generation adjustment signal comprises a charging signal or a discharging signal for the energy storage device.

* * * * *